Jan. 19, 1965 F. L. ROSEN ETAL 3,166,720

LINEAR AMPLIFIER WITH A NON-LINEAR FEED-BACK NETWORK

Filed June 25, 1962 2 Sheets-Sheet 1

INVENTOR.
FRANK L. ROSEN
JOHN F. FLOOD
BY
Ernest L. Brown
ATTORNEY

LINEAR AMPLIFIER WITH A NON-LINEAR FEED-BACK NETWORK

Filed June 25, 1962 2 Sheets-Sheet 2

INVENTOR.
FRANK L. ROSEN
JOHN F. FLOOD
BY
Ernest L. Brown
ATTORNEY

3,166,720
LINEAR AMPLIFIER WITH A NON-LINEAR FEED-BACK NETWORK

Frank L. Rosen and John F. Flood, Anaheim, Calif., assignors to North American Aviation, Inc.
Filed June 25, 1962, Ser. No. 204,788
2 Claims. (Cl. 330—110)

This invention pertains to a linear amplifier which has a non-linear feed-back circuit. More particularly, this invention pertains to a linear amplifier which has a predetermined finite forward impedance, which has a feed-back circuit adapted to remain opened until the output voltage reaches a predetermined magnitude, and which is adapted to increase the feed-back current, at some predetermined maximum output voltage.

In computer circuits it is frequently necessary to use amplifiers. The amplifier must be precisely linear over a wide range of input voltages. Amplifiers customarily have a maximum output voltage beyond which they saturate and become non-linear. It is desirable to limit the excursion of the output voltage of an amplifier to keep it within the linear range. If the amplifier saturates, the output voltage does not follow the input voltage. If the input voltage is removed, a substantial and finite length of time is needed for the amplifier to return from its saturated state into its linear range. The device of this invention is adapted to be connected to an amplifier to prevent the output voltage from increasing above some predetermined critical voltage to prevent the amplifier from saturating. With the circuit of this invention, the output voltage of the amplifier precisely and linearly follows the input voltage within the limitations imposed by the time constant of the circuit. If the input voltage tends to exceed its expected range and therefore, drive the amplifier into saturation, the feed-back network of this invention operates to increase the feed-back current, thus preventing saturation.

It is therefore an object of this invention to limit the output voltage of an amplifier.

It is another object of this invention to prevent an amplifier from saturating.

It is still another object of this invention to maintain a fast recovery time in an amplifier.

It is still another object of this invention to feed-back a limiting current from the output to the input of an amplifier when the output voltage tends to exceed a predetermined critical amplitude.

Other objects will become apparent from the following description, taken in connection with the accompanying drawings, in which.

Figure 1:
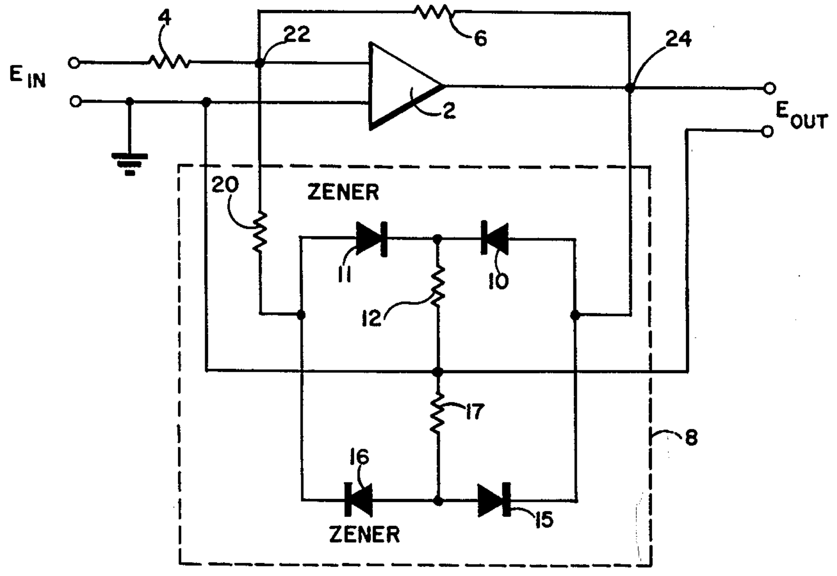
FIG. 1 is a schematic diagram of a typical embodiment of this invention.

Referring to FIG. 1, an input voltage is applied at the terminals marked $E_{in}$. The transfer impedance of the amplifier 2 and of the voltage gain of the circuit during linear operation is determined by the resistance values of resistors 4 and 6, together with the input impedance of amplifier 2. Resistor 4 is connected in series with one of the leads to the input of amplifier 2. A resistor 6 is connected between terminals 22 and 24 on the input and output of amplifier 2, respectively. The amplifier output voltage appears across the terminals marked $E_{out}$.

The non-linear feed-back circuit 8, of this invention, is connected between terminals 24 and 22. Circuit 8 comprises a pair of networks in parallel, connected in series with resistor 20. The first of the two parallel networks comprises a non-zener diode 10 and a zener diode 11 connected with their cathodes together in the series branches of a first T network with resistor 12 connected to said cathodes in the shunt branch of the T network. The anode of diode 10 is connected to terminal 24 and the anode of zener diode 11 is connected through resistor 20 to terminal 22. The second parallel network of feed-back network 8 is a non-zener diode 15 and a zener diode 16 connected with their anodes together in the series branches of a second T network, with a resistor 17 connected to said anodes in the shunt branch of the second T network. The cathode of diode 15 is connected to terminal 24 and the cathode of zener diode 16 is connected through resistor 20 to terminal 22.

Figure 2:
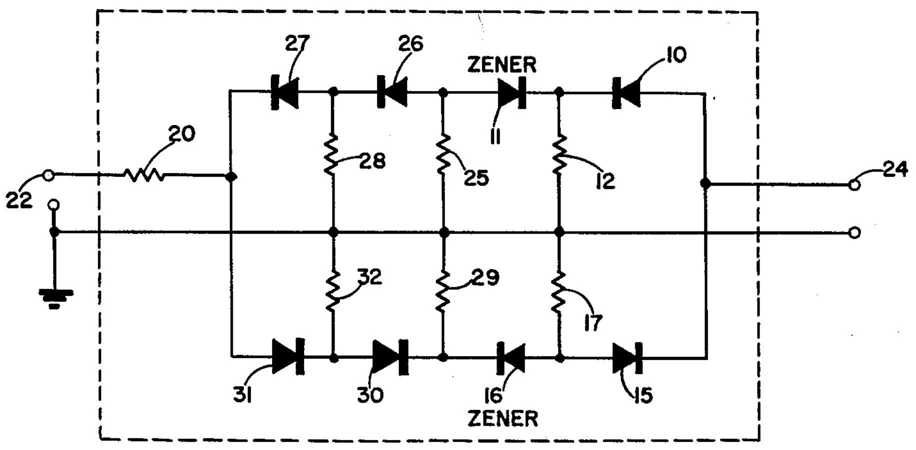
FIG. 2 is a schematic diagram of a preferred feed-back network in accordance with this invention.

In another embodiment of the feed-back network of this invention, shown in FIG. 2, a pair of ladder diode-blocking networks are connected between the zener diodes 11 and 16, and resistor 20. The first ladder network comprises an input shunt resistor 25, a series diode 26 connected with its anode to the anode of the zener diode 11, a shunt resistor 28, and a diode 27 connected with its anode to the cathode of diode 26. The second ladder network comprises an input shunt resistor 29, a diode 30 connected with its cathode to the cathode of zener diode 16, a shunt resistor 32, and a diode 31 connected with its cathode to the anode of diode 30. As many sections of diode blocking may be used, as desired.

Referring to FIG. 1, as long as the output voltage $E_{out}$ is less than a predetermined critical amplitude, which is equal to the zener voltage of zener diodes 11 and 16, only one of diodes 10 or 15 conducts. If the output voltage is positive, diode 10 conducts to cause the output voltage to appear across resistor 12. Zener diode 11 and diode 15 are open circuits. Thus, the connection between the output terminal 24 and the input terminal 22 is tied only by resistor 6. Similarly with a negative $E_{out}$ voltage, diodes 10 and 16 are open circuits leaving the connection between terminals 24 and 22 connected only by resistor 6.

Because zener diodes frequently conduct leakage current, additional blocking diodes such as diodes 26, 27, 30 and 31 of FIG. 2 are frequently used. In the circuit of FIG. 2, if the voltage at terminal 24 is positive but less in magnitude than the zener voltage of zener diode 11, diode 10 conducts which causes the voltage of terminal 24 to appear across resistor 12. The voltage appearing across resistor 12 is less than the zener voltage of zener diode 11. However, if the zener diode 11 leaks current, a voltage appears across resistor 25 but the voltage across resistor 25 is too small to cause diode 26 to conduct.

As the voltage at terminal 24 approaches the amplitude of the zener voltage of zener diode 11, diode 26 may start to conduct to generate a voltage across resistor 28 which is insufficient to cause diode 27 to conduct.

When, however, the voltage across terminal 24 increases beyond a predetermined value, i.e., the zener voltage of zener diode 11, the voltage appearing across terminals 24 appears substantially unattenuated across resistor 12. Because the voltage across resistor 12 is greater than the zener voltage of diode 11, a significant current flow through resistor 25 which causes diode 26 to conduct through resistor 28, which causes diode 27 to conduct to apply a voltage to the input terminal 22 of amplifier 2.

If the voltage appearing across terminals 24 is negative rather than positive, the circuit of diodes 15, 16, 30 and 31 and resistors 17, 29 and 32 carry the current flow.

In a typical circuit, resistor 4 might be 2 megohms, resistor 6 might be 20 megohms, the open loop gain of amplifier 2 would be very large, e.g., 50 million, resistors 12, 17, 28 and 32 might be 33,000 ohms, resistors 25 and 29 might be 4700 ohms, resistor 20 might be 20,000 ohms, diodes 10, 15, 26 and 30 might be type 1N485, zener diodes 11 and 16 might be type SV169, and diodes 27 and 31 might be type PS520.

Consider the above described amplifier and feed-back network adapted to amplify linearly a range of input voltages between zero and two volts with an amplification of ten. By choosing precise resistors 4 and 6, the amplification can be made substantially constant over the required input voltage range.

To limit the deviation from linearity to—for example—less than 0.010%, caused by network 8, the transfer impedance ($E_{in}/I_{out}$ with the output shorted) of the network must be such that the parallel combination of network 8 and resistor 6 shall have a resistance which does not deviate from 20 megohms by more than 0.010%. Designating the transfer impedance of network 8 as "R,"

$$\frac{(20)(10^6)R}{(20)(10^6)+R}\Big/(20)(10^6)\geq(1.0000-0.0001)$$

whence $R \geqslant 200{,}000$ megohm as long as $E_{out}$ is below its saturating amplitude.

With the circuit adapted to remain linear over at least a range of 0–2 volts at $E_{in}$, if it is desired that a maximum of—for example—500 volts at $E_{in}$, should not saturate the amplifier, the output voltage, $E_{out}$, may be limited by network 8 to—for example—30 volts. Then the breakdown voltage drop of circuit 8, plus the resulting closed loop gain time $E_{in}$ must be less than the desired maximum output voltage $$E_{out\ maximum} \geq \text{breakdown voltage of circuit } 8+K(500)$$

where K is the resulting gain of the entire circuit with circuit 8 conducting:

$$30 \geq 24+500K$$

$$6 \geq 500K$$

$$K \leq \frac{6}{500}=0.012$$

Thus the transfer impedance of the entire circuit must change from 20 megohms when it operates in the linear range to less than (20) ($10^6$) (0.012)=24000 ohms when circuit 8 conducts.

Figure 3:
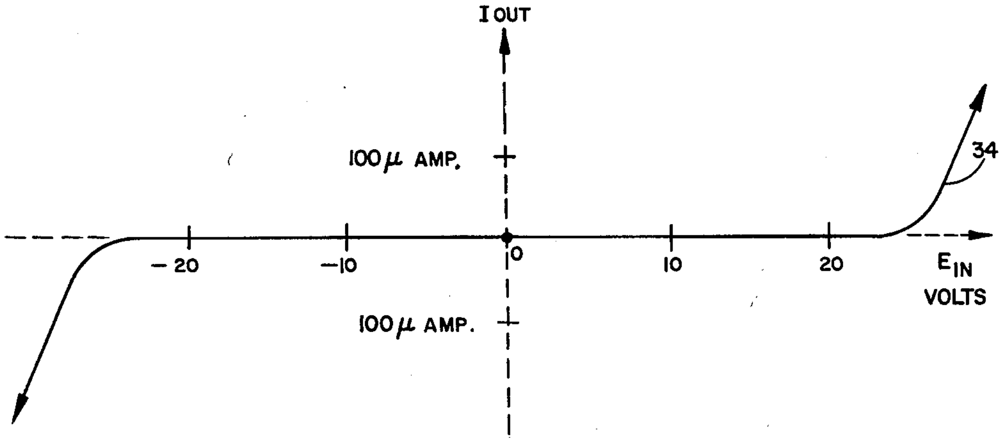
FIG. 3 is a graph of the current at the output terminals of the circuit of FIG. 2 as a function of the input voltage to said circuit.

FIG. 3 is a plot of current flow from terminal 24 to terminal 22 of circuit 8 with the above listed parameter values. It is to be noted that the current flow is insignificant until the applied voltage $E_{in}$ exceeds 24 volts.

Figure 4:
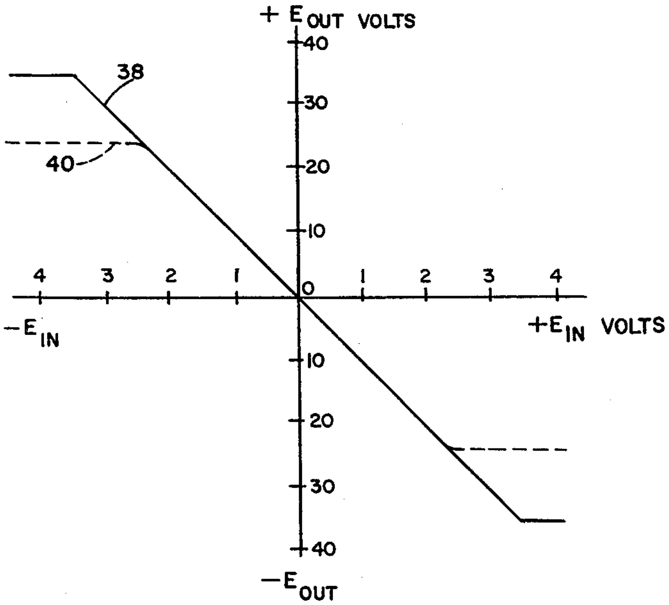
FIG. 4 is a graph of the output voltage plotted against the input voltage of the amplifier both with the feed-back network and without the feed-back network of this invention.

FIG. 4 is a plot of $E_{out}$ against $E_{in}$ of the circuit with the above listed parameter values. The curve 38 occurs without a circuit such as circuit 8. The plot 40 occurs with a circuit 8 with the above listed parameter values.

Thus the device of this invention limits the output voltage and prevents saturation of an amplifier when an excessive input voltage is applied and also does not interfere with the operation of the amplifier when in-range input voltages are applied.

Although the circuit of this invention has been described in detail, the invention is to be construed only in accordance with the spirit and scope of the appended claims.

We claim:

1. In a linear amplifier having a pair of input and a pair of output terminals, and having a predetermined transfer impedance,
   - a non-linear feedback network connected between said output and said input terminals comprising first and second ladder networks connected in parallel,
   - in which said first parallel network comprises a first T network whose shunt element is a resistor connected to the common cathodes of a first zener diode and a first non-zener diode in which the anode of said non-zener diode is connected to the output terminal of said amplifier, and in which said second parallel network comprises a second T network whose shunt element is a resistor connected to the common anodes of a second zener diode and a second non-zener diode with the cathode of said second non-zener diode connected to the output terminal of said amplifier and the cathode of said second zener diode connected to the input terminal of said amplifier,
   - a series resistor connected between said T networks in parallel and the input terminal of said amplifier,
   - and additional ladder network sections in series with each of said parallel connected T networks, each said ladder network section having a diode in series with and a resistor in shunt with said T networks, said additional ladder sections being connected between said zener diodes and the input terminal of said amplifier with the diodes in each being connected opposite in polarity to the connection of their associated zener diodes.

2. A device as recited in claim 1 and further comprising: a resistor connected in series between said last named parallel connected ladder networks and the input terminal of said amplifier.

References Cited in the file of this patent

UNITED STATES PATENTS

| | | |
|---|---|---|
| 2,945,950 | Midkiff | July 19, 1960 |
| 3,094,675 | Ule | June 18, 1963 |
| 3,098,199 | Carney et al. | July 16, 1963 |

OTHER REFERENCES

Korn and Korn: Electronic Analog Computers, N.Y., McGraw-Hill, 1952, page 274.